Patented July 29, 1952

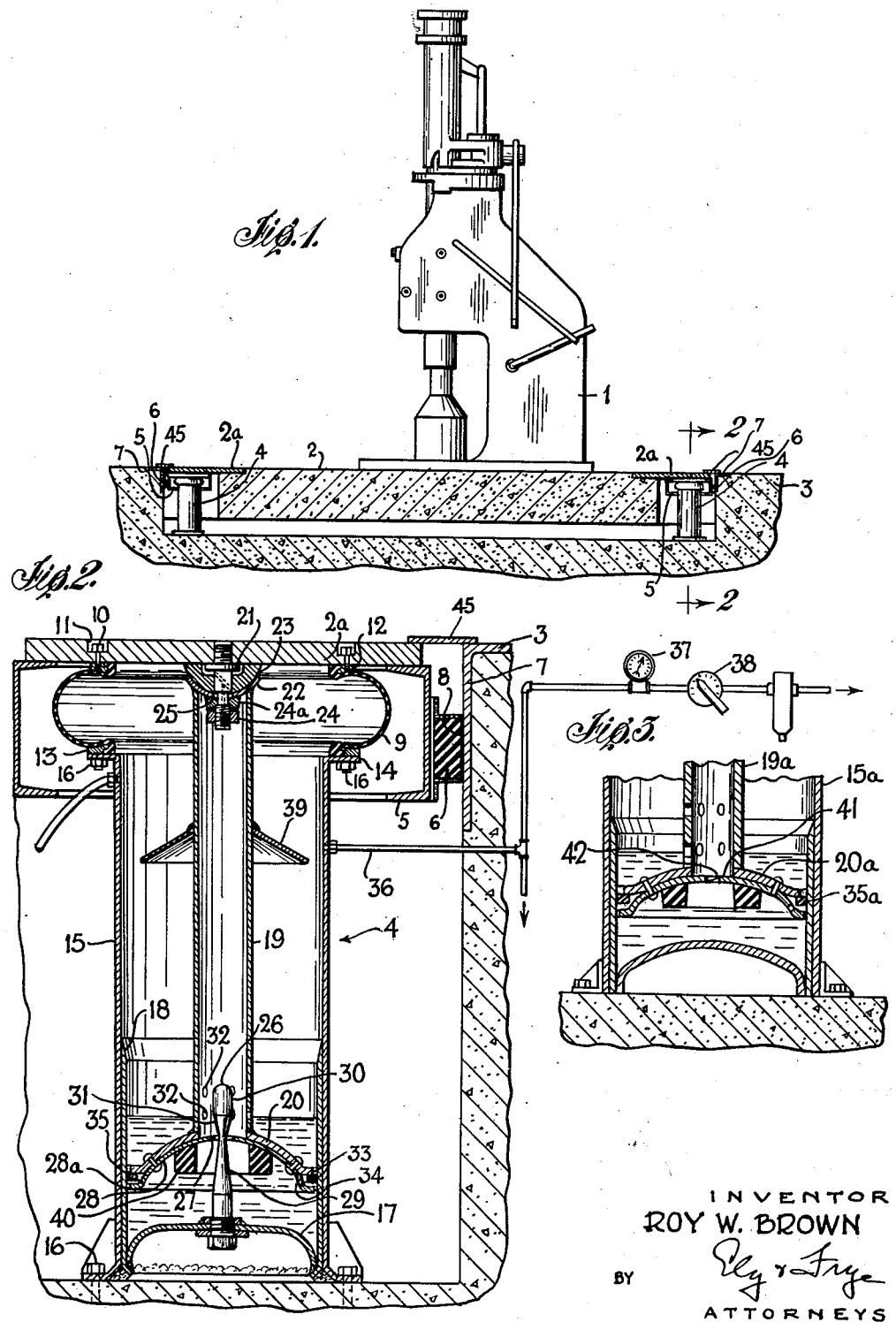

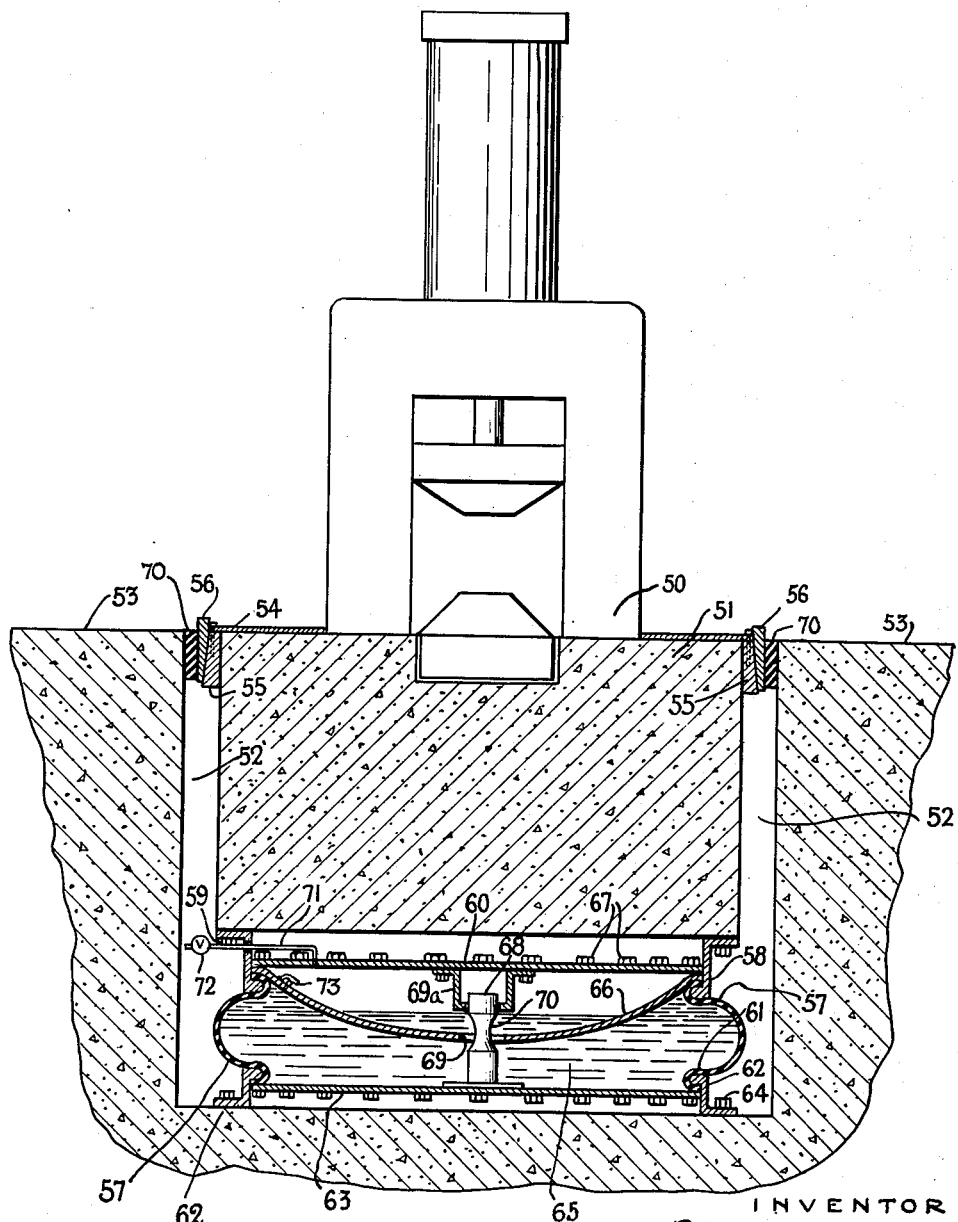

2,605,066

UNITED STATES PATENT OFFICE 2,605,066

AIR SPRING FOR HEAVY MACHINERY

Roy W. Brown, Akron, Ohio, assignor to The Firestone Tire & Rubber Company, Akron, Ohio, a corporation of Ohio Application December 21, 1946, Serial No. 717,739

5 Claims. (Cl. 248—20)

This invention relates to machinery supports, especially to resilient supports for heavy, impact generating machines, such as forging machines.

Heretofore there have been various types of bases, or mounts, provided for machinery and these various supporting devices have usually attempted to position a machine so as to cushion the jars or impacts set up thereby. These efforts have not been completely satisfactory, especially for heavy machines that generate high pressure impacts, and the life of many buildings has been shortened appreciably due to the vibration or jars transmitted to the building from machinery therein. Also, the shaking of a building naturally disturbs the people in the building and reduces their efficiency, while other machines in the building also are affected by such movement.

The general object of the invention is to provide an improved type of machinery support, characterized by its relatively high dynamic load capacity and by its smooth cushioning action on vertically directed impacts.

An important object of the invention resides in the provision of improved resilient mounting means adapted for the support of heavy machinery, such, for example, as trip hammers and the like which have a very high momentary impact which is mainly absorbed within the mount by a hydraulic pressure buildup. Such a buildup is a function of the rate of movement of one or more elements within the mount in response to the magnitude of the momentarily applied dynamic energy. The static load of the supported machine or object is mainly supported pneumatically, there being a correlation between the pneumatic and hydraulic supporting means to provide absorption of static load by the first and absorption of a substantial portion of the dynamic load by the second mentioned means.

Another object of the invention is to provide a novel, resilient support for heavy machinery, permitting limited universal movement of the machine supported.

A further object of the invention is to obtain the above objects by combining the use of a gas and a liquid as a machine supporting column.

Another object of the invention is to provide an improved adjustable pressure member for supporting any of a variety of machines.

Other objects and advantages will become apparent to persons skilled in the art upon examination of the drawings, the specification and the claims appended thereto.

Attention now is directed to the accompanying drawings wherein:

Fig. 1 is an elevation of a machine support embodying the principles of my invention;

Fig. 2 is an enlarged vertical section on line 2—2 of Fig. 1;

Fig. 3 is a fragmentary vertical section of a modified valve means of the invention; and Fig. 4 is an elevation, partly in section, of a modification of the invention.

Referring in detail to the structure shown in the accompanying drawings, a large heavy forging machine I is shown secured to a rectangular base plate 2, of any suitable material such as reenforced concrete, with corner plates 2a secured thereto. The machine I may be any type that generates impacts or vibrations requiring resilient support. The base plate 2 is resiliently supported in a recessed portion of a foundation 3 by a plurality of mounting units, indicated generally by the numeral 4, positioned beneath the corner plates 2a. The corner plates 2a have box members 5 secured to their lower surfaces in any conventional manner, preferably formed of channel members, the boxes 5 being positioned at the upper ends of the mounting units 4 to form a part thereof.

To prevent side movement of the mounted machine, rubber blocks 6 are suitably secured to the outer surfaces of boxes 5 adjacent the walls of foundation 3, in contact with plates 7 embedded in the walls of foundation 3. The rubber blocks 6 may have a friction material covering 8 of fabric impregnated with a thixatropic lubricating composition to impart thereto the unusual property of a greater kinetic coefficient of friction than static coefficient of friction. One example of the components of such lubricant composition is castor oil, a wax compatible with the oil, and an aluminum soap uniformly dispersed in the composition. Graphite also may be present in the composition, if desired. The blocks 6 may be of a dimension commensurate with the frictional properties of the material employed.

Each load supporting and mounting unit 4 includes a flexible, semi-tubular air spring bellows 9 of reenforced rubber coated fabric, for example, the air spring bellows shown and described in my U. S. Pat. No. 2,221,470. The upper end of bellows 9 is clamped in fluid sealing engagement to the lower surface of base plate 2a by means of a ring 12, screws 10 extending through bores 11 in plates 2a providing the required clamping pressure. The lower edge or bead of bellows 9 is clamped by a ring 13 to effect a fluid seal with the upper flange 14 of a hollow cylindrical member 15 secured to foundation 3 by bolts 16. An upwardly dished plate 17 is marginally bonded to the lower end of cylinder 15 to complete a fluid seal within the unit comprising bellows 9 and cylinder 15. A reenforcing sleeve 18 may be positioned in the lower end of the cylinder 15 to permit the use of a lighter weight cylinder than would otherwise be required.

The salient feature of the invention is the provision of means for employing both gas and liquid interiorly of the unit comprising the air spring bellows 9 and cylinder 15 in a manner to carry the machine while absorbing shocks and vibrations therefrom more efficiently than is possible with known prior art devices. To this end, a volume of a substantially non-compressible liquid, such as oil, is positioned in the cylinder and a tubular piston rod 19 positions an associated concave faced piston 20 in the liquid. The piston rod 19 is mounted for limited universal movement on the lower side of the corner plate 2a by a stud 21. The piston rod 19 has a concave end piece 22 secured, as by welding, to its upper end to seat with a semi-spherical member 23. The stud 21 extends through the member 23 to secure it to the corner plate 2a and lock nut 24 and spacer 24a are used to secure the end piece 22 and rod 19 to the stud 21. The end piece 22 has a central aperture 25 therein through which the stud extends and in which the stud may have limited movement.

Impact set up by the machine 1 naturally tends to compress the unit 4 and this action pushes the piston 20 into the liquid carried by the cylinder. Suitable valve means are provided to control the flow of liquid past the piston 20 to regulate the movement thereof. In this instance, a metering pin 26 is secured to plate 17 to project upwardly therefrom through a center bore 27 in a concave valve plate 28, riveted to piston 20. Plate 28 has a radially extending marginal flange 28a providing a packing groove with marginal portions of piston 20, as later described. The pin 26 has a tapered shank section 29 leading into a reversely tapered section 31 to provide a narrow neck portion therebetween. Tapered section 31 leads into a cylindrical head 30. Pin 26 is so adjusted that under static load of the supported machine 1, the neck intermediate tapered sections 29 and 31 is in registry with bore 27. However, on relative movement of the piston rod 19 and pin 26 in either direction, the effective orifice decreases, thereby rendering the support stiffer with increase of load. A plurality of apertures 32 are provided in the lower end of the tubular piston rod for flow of fluid therethrough.

A check-valve action is provided in the following manner to allow the piston to permit relatively free rebound motion of the support. Piston 20 has a plurality of circumferentially spaced recesses 33 formed in its periphery, a plurality of apertures 34 being provided in plate 28 at the inner edge of the flange 28a. A rubber sealing ring 35 is positioned for loose engagement between flange 28a and the corresponding portion of piston 20. On downward movement of the piston assembly, ring 35 and flange 28a seal the piston against leakage of fluid past the edge of the piston and all fluid flow must be through the orifice intermediate bore 27 and the metering pin. On rebound movement, the sealing ring 35 and flange 28a separate sufficiently to enable fluid flow past the edge of the piston initially to lessen dampening, fluid also passing through bore 27 on such movement. As above stated, the dynamic load of the supported device, which may represent tremendous momentary energy build-up, is absorbed in large part hydraulically.

Since the static load of the supported device is mainly supported pneumatically, an appreciable air pressure is initially set up in units 4 and to this end an air pressure supply line 36 connects to the cylinder 15. The line 36 has a gage 37 and a control valve 38 connected therein so that any desired amount of air may be admitted to the cylinder. The pressures in the units 4 may extend from a low of about 300 pounds per square inch to a high of about 1200 pounds per square inch. A baffle plate 39 may be secured to the outer surface of the tube 19 adjacent its upper end and an annular rubber bumper 40 may be carried by the lower surface of the plate 28 to cushion the piston 20 in case it bottoms on the plate 17. A sealing, or guard strip 45, may be positioned over, or in the space between the base plate 2 and the foundation 3 to prevent entry of foreign material into such space.

Any conventional valve may be used in the practice of the invention and Fig. 3 shows a modified type of valve wherein a tubular piston rod 19a carries a concave faced piston 20a. A concave valve plate 41 having an orifice 42 therein is secured to the face of the piston 20a to limit flow of liquid past the piston on movement of the piston in the cylinder 15a. The orifice 42 is of a predetermined size dependent upon the anticipated load conditions therefor and it controls flow of liquid past the piston 20a on relative movement of the piston rod 19a inwardly of the cylinder 15a. On rebound, sealing ring 35a pulls or moves out of sealing relation between the cylinder 15a and piston 20a to lessen the resistance to movement of the load support piston 20a.

Fig. 4 shows a large forging machine 50 carried by a foundation block 51 of any suitable material, such as concrete, and which is received in a well 52 formed in a foundation 53. The block 51 may have a cover plate 54 suitably secured thereto and the block is positioned centrally of the well 52 by any suitable devices such as wedges 55 and 56. The wedges 55 are suitably secured to the cover plate 54 while the wedges 56, which are oppositely inclined with relation to the wedges 55, are driven in between the wedges 55 and rubber blocks 70 secured to the side wall of the well 52. The wedges permit a small vertical movement of the block 51 while functioning to provide lateral support for it at any of its positions. The wedges may extend the lengths of the sides of the block 51. Preferably, the wedges 56 are driven into position after the rest of the apparatus is assembled and suitable devices (not shown) may be associated with such wedges to enable them to be lifted from their assembled positions, when desired.

While Fig. 1 shows a plurality of the resilient supporting elements of the inventions used in combination with a load, it is not necessary to use the load supports in that manner and Fig. 4 shows one large air spring bellows 57 supporting the block 51 and machine 50. A tubular metal member 58 is secured to the block 51 by bolts 59 while a locking and sealing plate 60 is used to secure the upper end of the air spring removably to member 58. The lower end of the air spring is removably clamped to an overhanging flange 61 of a ring 62 by a bottom plate 63 to form a load support chamber with the bellows. Bolts 64 secure ring 62 to the foundation 53.

Load on the member 58 is supported both by a liquid 65 and by compressed gas confined in the bellows 57. A dished piston plate 66 is secured to the member 58 by bolts 67 that secure the sealing plate 60 to the member 58. To snub movements of the piston plate 66 and associated means when a kinetic force is applied to the machine 50, a metering pin 68 is secured to the sealing plate 63 and it extends up through an orifice 69 in the piston plate 66. The upper end of the pin 68 is loosely received in a guide cup 69a that is secured to the plate 60 and extends downwardly therefrom. A reduced diameter neck section 70 is provided on the metering pin 68 and it normally is positioned in the orifice 69 to permit a maximum area of the orifice to be unobstructed at static load conditions. Then on compression of the bellows 57, liquid is forced through the orifice 69 and this moves the plate 66 downwardly with relation to the neck portion 70 so as to reduce the active area of the orifice 69. This combines with the inherent snubbing action of the metering pin 68 to retard relative movement of the piston plate 66 (and supported load) and the foundation 53.

A conduit 71, having a valve 72 therein, connects to the sealing plate 60 to supply compressed air or gas to the air spring bellows 57 to set up an initial pressure in the bellows 57 to aid in static load support. A small flapper valve 73 is secured to the upper surface of the piston plate 66 adjacent its upper edge to bleed entrapped air out of the pocket below the upper edge of plate 66.

In this type of apparatus, the initial pressure is maintained at a value such that impacts transmitted thereto by machine 50 cause only slight displacement or further compression of the bellows 57, such as a displacement of one-half to one inch.

Thus it will be seen that the invention provides an uncomplicated, sturdy, adjustable load support, advantageously combining both pneumatic and hydraulic cushioning to absorb the static load, operational vibrations, and impacts of high magnitude set up by a supported machine.

In accordance with the patent statutes, embodiments of the invention have been completely shown and described herein but it will be realized that the scope of the invention is defined in the appended claims and that the invention is not limited to the examples disclosed herein.

What is claimed is:

1. Support apparatus for a forging machine comprising a plurality of resilient members disposed about a base upon which said machine is mounted, each of said resilient members comprising a bellows and a hydraulic snubbing device associated therewith, said bellows being connected to a source of fluid under pressure, said bellows normally sustaining the static load of said machinery and base and being capable of downward deflection under the dynamic loads imposed thereon, said hydraulic device comprising a fixed cylinder supporting said bellows and a piston connected to said bellows and adapted to move downwardly within said cylinder when said bellows deflects under the dynamic loads and valve means permitting a restricted flow of liquid through said piston upon downward movement of the same within the cylinder.

2. Apparatus according to claim 1 and means associated with said piston permitting a free return of said piston when said bellows returns to normal position after said dynamic loads have been dissipated.

3. Apparatus according to claim 2 in which said valve means is adapted to meter liquid at a rate varying with the linear movement of said piston.

4. A resilient support for a forging machine comprising a base plate having corner plates secured thereto, said base plate being adapted to support said machine, a plurality of resilient mounting units disposed under and engaging said corner plates to support said base plate, each said unit including a tubular member in the form of a bellows, means comprising a ring and screws attaching the top end of said bellows to the undersurface of said corner plates in fluid-tight relation therewith, said bellows being connected to a source of air under pressure and normally sustaining said base plate through the medium of said corner plates under static load and being capable of downward movement under static load such as that created by a hammer blow of a forging machine, hollow cylinders attached in fluid-tight relation to the lower ends of said bellows, the lower end of said cylinders resting upon and being attached to a permanent foundation, hollow piston rods attached to the underside of said corner plates in a manner providing limited universal movement therebetween, said rods extending downwardly from the corner plates into the cylinders, liquid disposed in the lower ends of the cylinders and closure plates sealing the lower ends thereof preventing the escape of said liquid, pistons carried by the lower ends of the piston rods, said pistons being immersed in said liquid, center openings through said pistons, metering pins having narrow necks intermediate their ends attached to and extending upwardly from said closure plates projecting through said openings in said pistons into the hollow piston rods, whereby said fluid is metered by said piston in controlled flow upon vertical movement of said corner plates.

5. A resilient support for a forging machine comprising a base plate adapted to carry said machine, said base plate having corner plates attached thereto, resilient means engaging with said corner plates to support same, said resilient means including flexible substantially tubular members in the form of bellows, means engaging one end of said bellows to the undersurface of said corner plate in fluid-tight relation thereto, a hollow cylinder attached in fluid-tight relation to the lower ends of said bellows, said bellows being connected with a source of air under pressure and normally sustaining said corner plate under static load and being capable of downward movement under dynamic load imposed thereon, the lower ends of said cylinders being fixedly attached to a foundation, piston rods, said rods being secured to said corner plates with the rods being in and extending downwardly of said cylinders, means sealing the lower ends of said cylinders which has a liquid therein, said means comprising closure plates in the lower ends of the cylinders in fluid-tight attachment therewith, pistons carried by the lower ends of said piston rods, said pistons being immersed in said liquid, valve means positioned within said cylinders at the lower ends thereof, said valve means including center openings through said pistons, metering pins attached to said closure plates and projecting upwardly therefrom through said openings in said pistons, whereby said fluid is metered past said pistons at a controlled rate on vertical movement of said corner plates with relation to said cylinders.

ROY W. BROWN.

REFERENCES CITED

The following references are of record in the file of this patent:

UNITED STATES PATENTS

| Number | Name | Date |
|---|---|---|
| 586,592 | Burleigh | July 20, 1897 |
| 1,064,203 | Furlow | June 10, 1913 |
| 1,304,311 | Heldrich | May 20, 1919 |
| 1,719,308 | Pospeshil | July 2, 1929 |
| 2,361,575 | Thomson | Oct. 31, 1944 |
| 2,380,899 | Strachovsky | July 31, 1945 |
| 2,451,171 | Mueller | Oct. 12, 1948 |